United States Patent [19]

Fink

[11] Patent Number: 4,744,634
[45] Date of Patent: May 17, 1988

[54] METHOD AND APPARATUS FOR REDUCING THE EFFECTS OF VIBRATIONAL DISTURBANCES ON THE FREQUENCY STABILITY OF A LASER

[75] Inventor: David Fink, Los Angeles, Calif.

[73] Assignee: Hughes Aircraft Company, Los Angeles, Calif.

[21] Appl. No.: 856,559

[22] Filed: Apr. 28, 1986

[51] Int. Cl.$^4$ .......................... H01S 3/02; G02B 9/02
[52] U.S. Cl. .................................. 350/163; 356/352; 372/107
[58] Field of Search ................ 350/163; 372/107, 32; 356/352

[56] References Cited

U.S. PATENT DOCUMENTS

| | | | |
|---|---|---|---|
| 3,517,331 | 6/1970 | Baird et al. | 372/107 |
| 3,581,231 | 5/1971 | Freiberg | 372/107 |
| 3,635,562 | 1/1972 | Catherin | 356/352 |
| 3,697,887 | 10/1972 | Lee et al. | 356/352 |
| 3,808,553 | 4/1974 | Locke et al. | 372/107 |
| 3,858,122 | 12/1974 | Angelbeck et al. | 372/33 |
| 4,293,223 | 10/1981 | Seaton | 356/352 |
| 4,439,862 | 3/1984 | Mohler | 372/107 |
| 4,444,501 | 4/1984 | Schwiesow | 356/352 |
| 4,468,773 | 8/1984 | Seaton | 372/32 |
| 4,468,777 | 8/1984 | Takemori et al. | 372/107 |
| 4,480,914 | 11/1984 | Thompson et al. | 356/352 |

OTHER PUBLICATIONS

Robert G. Seippel, *Optoelectronics*, Reston Publishing Co., Inc. (1981), p. 300.
"Sea Lite Beam Director," *Design Analysis Report and Preliminary Design Review*, Hughes Aircraft Company, May 1980.
"Periscope System Operating Instructions (Technical)," report on the Multi-Mirror Telescope, University of Arizona (H-1006 A).

*Primary Examiner*—John K. Corbin
*Assistant Examiner*—Martin Lerner
*Attorney, Agent, or Firm*—Ronald L. Taylor; A. W. Karambelas

[57] ABSTRACT

A method and apparatus are disclosed for mounting an interferometer cavity such as a laser so that constant interferometer resonant frequency is maintained in spite of environmental vibration and other external acceleration forces. The invention can be used alone or in combination with prior art frequency stabilization systems, such as shock mounts and active feedback type stabilization systems.

13 Claims, 4 Drawing Sheets

METHOD AND APPARATUS FOR REDUCING THE EFFECTS OF VIBRATIONAL DISTURBANCES ON THE FREQUENCY STABILITY OF A LASER

The Government of the United States of America has rights in the invention pursuant to Contract No. F33657-83-C-2134, General Dynamics 57-30156.

BACKGROUND OF THE RELATED ART

1. Field of the Invention

The invention relates to methods and apparatus for controlling the resonant frequency of optical interferometer cavities and more particularly to laser frequency control.

2. Description of the Related Art

Lasers and other similar interferometer resonant devices are subject to changes in resonant cavity frequency caused by acceleration forces that cause the physical dimensions of the resonant cavity to vary. In the case of lasers, vibrational forces can cause changes in the optical path length between the cavity reflectors, thus causing changes in the laser output frequency as compared to what would be obtained if the structure were undisturbed or perfectly rigid. Since the performance of many laser devices depends upon the frequency stability of the laser source, freedom from vibrationally-induced frequency changes is an important goal.

In the past, a number of frequency stabilization solutions have been put forward. The main approach has involved an attempt to make the interferometer structure as rigid as possible in order to minimize the effects that vibration has on the dimensions that define the resonant frequency of the interferometer cavity. Another common approach includes passive systems that attempt to isolate the laser structure from vibrations through various shock-mount schemes. Active stabilization has also been used, which involves detection of frequency shifts and the application of correcting forces to the cavity. This involves active electronics, electromechanical type transducers, and other complex devices and circuits. In such active systems, there is the additional problem of accurate detection of the frequency error, which can often be subject to the same vibrationally-induced errors that are causing the need for frequency correction in the main laser system. Additional approaches include devices such as the Spectra-Physics Stabilite, which is a resonator structure mounting system that employs pivots in an attempt to minimize the coupling of torques and other distorting forces to the interferometer cavity. Other approaches utilize various combinations of increased stiffness, shock-mounting, and active stabilization in an attempt to solve the problem. None of the aforementioned approaches, or any combination thereof, provide a solution that is concurrently simple, rugged, and inexpensive.

SUMMARY OF THE INVENTION

A method and apparatus are disclosed for mounting a resonant interferometer structure so as to minimize the effects of vibrational disturbances on the resonant cavity frequency of the interferometer. Instead of providing vibration isolation, this invention provides for the selection of an optimum mounting configuration that eliminates the first order effects of vibration and similar external acceleration forces.

The present invention reduces the effects of vibrational disturbances on the resonant frequency of the subject interferometer simply by selecting optimum locations for the structural mounts or supports. The present invention has a number of advantages including simplicity, absence of external controls or components, and the fact that it does not preclude using any other available method of reducing vibrational effects, so that these other methods may be also used if desired.

The present invention reduces or eliminates the need for soft-mount or shock-mount vibration isolation. Vibration isolation has an undesirable side effect of also isolating the interferometer (for example, a laser) from precise pointing direction control.

For the purpose of simplicity and explanation, the following specification will deal primarily with lasers, although the method and apparatus of this invention can be successively applied to almost every type of resonant interferometer cavity structure that suffers from vibrationally-induced resonant frequency variations.

DETAILED DESCRIPTION OF THE INVENTION

The resonant frequency of an interferometer cavity, such as a laser, depends on the optical path between the mirrors. If the index of refraction does not change, the frequency depends on the physical distance between the mirrors, such that $$\Delta f/f = \Delta L/L,$$

where f is the optical frequency of the laser light, $\Delta f$ is the change in this frequency, L the cavity length, and $\Delta L$ the change in the cavity length. This relation makes the frequency very sensitive to cavity length changes. For example, an infrared $CO_2$ laser operating at 10.6 $\mu$m wavelength has an optical frequency of $28 \times 10^{12}$ Hz. To hold the frequency stable within 30 kHz for some period of time requires the length to be held fixed to a tolerance of 1 part in $10^9$ during the time period. If the laser is 20 cm long, this requires the length to not change by more than 2 Angstroms during the time period.

Figure 1:
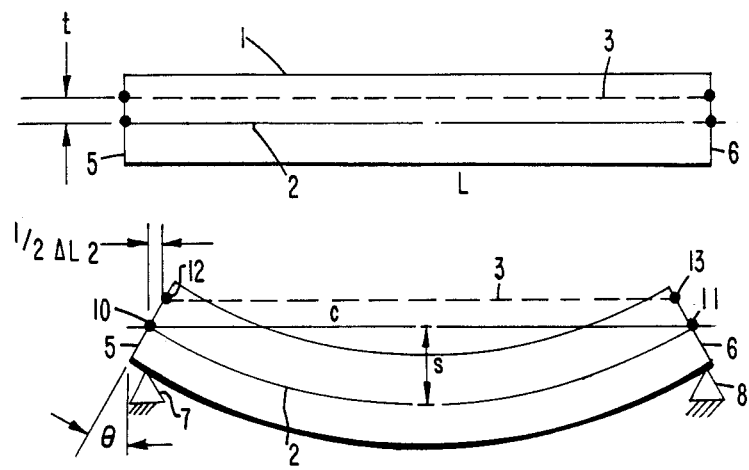
FIG. 1 illustrates cavity length changes due to sagging of the interferometer structure.

One way the vibration affects the cavity length is shown in FIG. 1, which shows a simple beam 1 simply supported by two supports 7 and 8. The beam structures shown in FIG. 1 represent an idealized laser structure where the ends 5 and 6 of beam 1 represent laser mirrors and the beam 1 represents the mirror support structure. The sag between the supports 7 and 8, actually on the order of tenths of a $\mu$m, is exaggerated in the drawing. The line 2 represents the neutral axis of the beam—that line that is neither stretched nor compressed by the sag.

In general, the optical axis 3 of the laser will not be on the neutral line 2, but offset as indicated in the figure.

There are two contributions to the change in cavity length caused by the sag: the chord length c measured between the end points 10 and 11 of the neutral axis 2 is less than the unsagged length L of beam 1 before the beam sagged, and tilting of the ends 5 and 6 of beam 1 changes the separation of the end points 12 and 13 of the optical axis if the optical axis was not originally coincident with the neutral axis.

There may also be an effect on the laser frequency due to mirror tilt even if the optical axis did not change in length. The illuminated spot on the mirror is of finite extent, so part of the optical path will lengthen and part shorten, even if the length of the optical axis itself remained of constant length while the mirrors tilted.

The change in the cavity length with sag s is $$\Delta L = (c - L) + 2\theta t$$

where $\theta$ is the mirror tilt and t is the offset of the optical axis 3 from the neutral axis 2. The first term can be calculated from the sag by approximating the shape of the beam with a circle. The mirror tilt angle can be found from standard structural mechanics formulas, as can the value of the sag. (The first term could be calculated exactly, but it is so much smaller than the second that the approximation is adequate.) The fractional change in length becomes $$\frac{\Delta L}{L} = \frac{-8s^2}{3L^2} + \frac{32st}{5L^2}$$

For a stainless steel structure 25 cm long and 4.5 cm thick in a 1 g acceleration field, the sag is 0.12 $\mu$m and the tilt angle is 1.6 $\mu$rad. If the optical axis is 1 mm off the neutral line, the first term can be neglected, $$\frac{\Delta f}{f} = \frac{\Delta L}{L} = 1.3 \times 10^{-8},$$

and the frequency shift of a 10.6 $\mu$m $CO_2$ laser would be 360 kHz. As long as the vibrational frequencies are well below the resonant frequency of the structure, this is the laser frequency sensitivity per g of acceleration. The laser will be freqeuncy modulated at the vibration frequency with a depth of modulation equal to this sensitivity times the magnitude of the acceleration.

Note that the second term in $\Delta L/L$ is larger than the first by the ratio of t/s, or about 10,000 times, so $\Delta L/L$ could be reduced by moving the optical axis closer to the neutral line. But the calculation already assumed an error of only 1 mm, and even if the axis were brought closer to the neutral line, the finite size of the illuminated area of the mirror would have some effect, especially since the mirror tilt would cause the laser mode to change slightly and move the illuminated area. Also in a real structure, it is very difficult or impossible to accurately locate the neutral axis.

Figure 2:
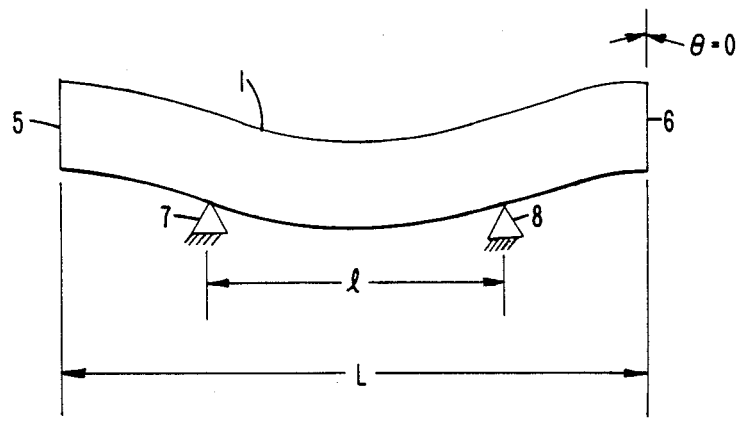
FIG. 2 illustrates the symmetric case of support locations.

This invention teaches of supporting the beam not at the ends or at the minimum stress locations usually selected by mechanical engineers, but of supporting the beam at locations such that the relative tilt of the ends of the beam is zero. Note that if both supports were moved near the center, the beam would sag to give tilts opposite those shown in FIG. 1. Therefore, there is an intermediate location for supports 7 and 8 that causes the beam to sag in a manner that gives zero tilts at the ends 5 and 6 of beam 1, as shown in FIG. 2. For a simply supported simple beam, that location is with the supports symmetrically located and separated by $1/\sqrt{3}$ (=0.58) of the length of the beam.

The mounting shown in FIG. 2 eliminates the portion of the cavity length change due to the optical axis not being on the neutral line. It also eliminates any effects due to the finite size of the illuminated spot on the mirrors. It eliminates any change in the laser mode shape. The only effect left is the shortening of the chord length between the mirrors, which has only 1/10,000 of the other effects to start with, and the shortening of the chord length is even smaller for this zero tilt mounting scheme because of the recurve shape of the beam in FIG. 2.

Figure 7A:
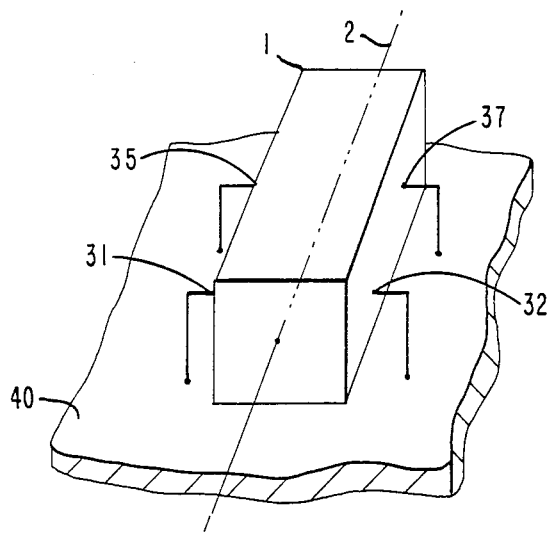
FIGS. 7a and 7b illustrate a simple optimal mounting for a three-dimensional interferometer structure.
Figure 7B:
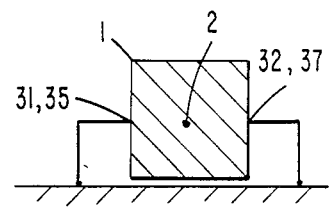

FIG. 2 shows the supports underneath the interferometer, which may be appropriate if the objectionable vibration acceleration is only in the vertical direction. To optimally support the interferometer structure in situations involving vibration acceleration in other directions, the supports should be attached to the structure in locations such as are illustrated in FIGS. 7a and 7b. In these figures, the interferometer is shown in perspective as a simply supported simple beam 1 and is supported at points 31, 32, 35 and 37. A line between points 31 and 32 passes through the neutral axis 2 of the beam 1 as does a line between points 35 and 37.

Figure 3:
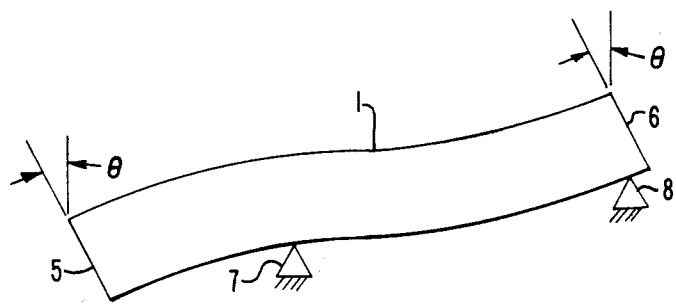
FIG. 3 illustrates the asymetic support locations.

If the laser is not a simply supported simple beam, the zero tilt mount locations will not necessarily be at $1/\sqrt{3}$ of the length, but they will always exist. There is also an asymmetric zero-tilt mount, as shown in FIG. 3, where the mirror tilts are not zero, but the same, so their effects on cavity length (and hence resonant frequency) cancel. In fact, there are an infinite number of asymmetric pairs of support locations that will produce the same result.

The discussion so far has focused on sensitivity to transverse vibrational input. The laser must also be stable against longitudinal vibrational input. If the vibrational input were applied from an end, the laser frequency stability would be more sensitive to the longitudinal vibrations than the transverse ones—three times more sensitive for the laser structure considered earlier. The longitudinal disturbances are not applied to an end, however, but to the two mounts, as shown in FIG. 4.

Figure 4:
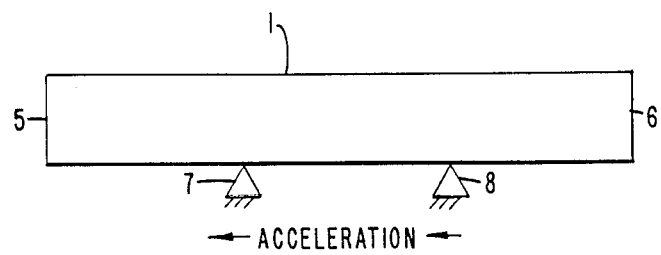
FIG. 4 illustrates longitudinal vibrational input.

Here, in FIG. 4, the compression ahead of the front support 7 cancels the stretch behind the back support 8, and the stretch of the front half of the segment between the supports cancels the compression of the back half of the segment between the supports, yielding a net change in total length of zero and no laser frequency change. However, the effectiveness of the longitudinal cancellation depends on matching the front and rear overhangs (between 5 and 7 and between 6 and 8, respectively) in FIG. 4; the fraction of the total cavity length left unmatched determines the improvement from the end-driven case. That is, if a fraction of the total cavity length is unmatched, the frequency disturbance effects are those of the end-driven case multiplied by this fraction.

Because the two ends of a laser are usually different for numerous considerations such as output coupling, frequency control servo loops, and spectral line selection, matching the overhang lengths is not adequate. There are mounting points that will match the overhang effects of any laser, but they will in general not be the same as those needed to compensate for the transverse vibrational effects. However, the longitudinal direction can be vibration isolated to any degree without causing a loss of pointing accuracy, whereas isolating the transverse direction can cause a loss of pointing accuracy. Therefore, one approach is to use a mounting system that minimizes the transverse effects and isolation to eliminate the longitudinal effects.

Figure 5:
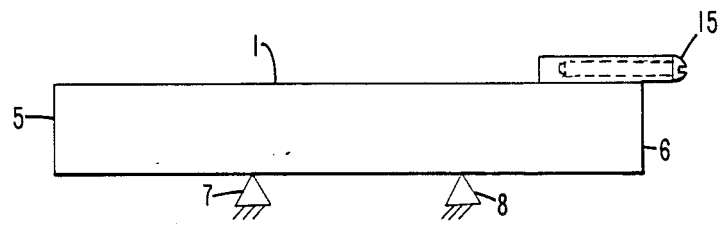
FIG. 5 illustrates an interferometer cavity with adjustable mass distribution.

It should be emphasized that one of the advantages of the present invention is that the benefits of the invention can be obtained not only by selecting mounting points, but by selecting and/or changing mass distribution, type of support attachment (e.g. free pivot or rigid connection), or even stiffness distribution in the interferometer structure. A continuously adjustable mass distribution scheme is illustrated in FIG. 5, which shows a screw-type device 15 placed on one end (or alternatively at either end or any other location) to provide a continuously variable mass distribution that can be used to "trim" the structure to obtain minimum vibrationally-induced frequency changes.

Stiffness distribution can be influenced by many well known factors including the following:

(1) choice of materials for the interferometer structure;
(2) thickness of interferometer walls (which can be changed by adding to or taking away wall material by, for example, machining or welding);
(3) size of structural components;
(4) presence of stiffeners such as ribs or stringers, which can either be an integral part of the interferometer structure or addon devices that are added to change stiffness.

Figure 6:
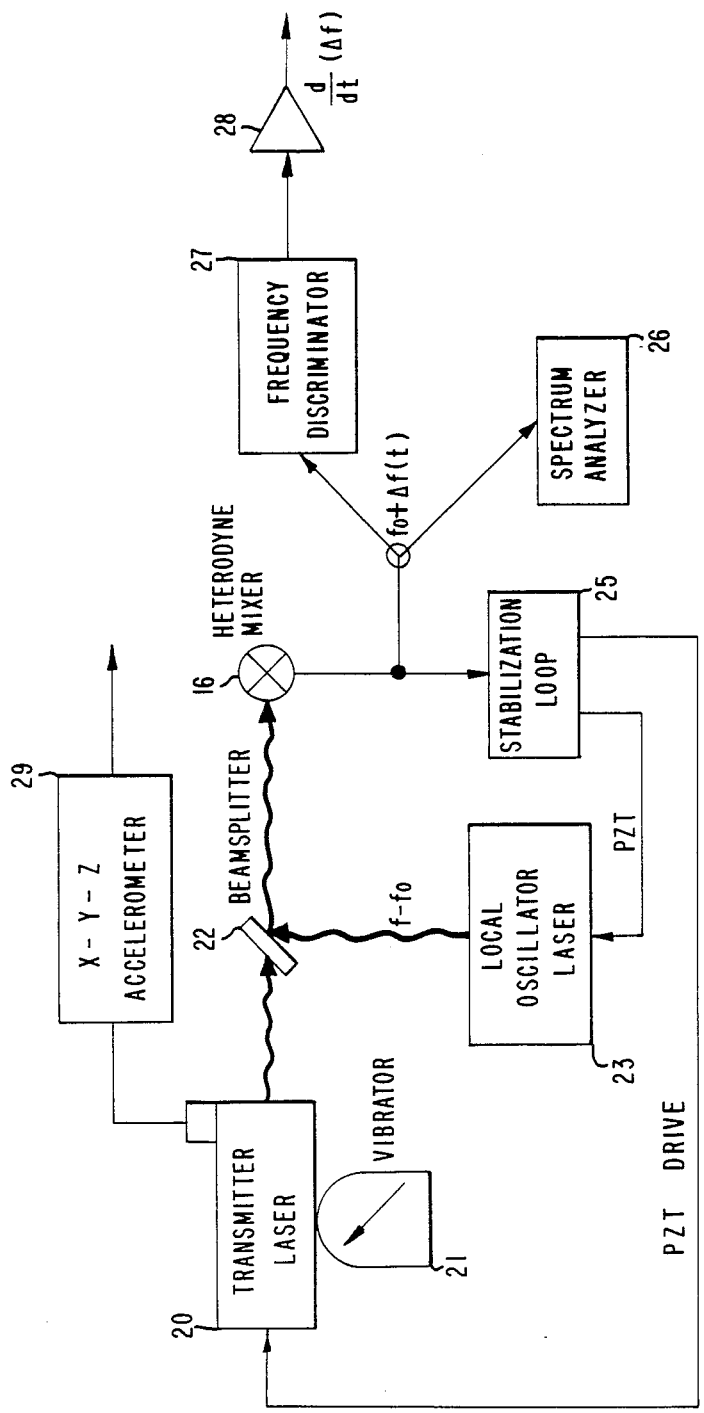
FIG. 6 is a block diagram showing a laboratory experiment for measuring and minimizing vibrationallycaused frequency instability.

In a typical application, optimal stiffeners distribution would be found experimentally, by using the test set-up illustrated in FIG. 6 and varying stiffness by one of the above-listed methods. Alternatively, optimal stiffness could be determined through dynamic mechanical modeling such as NASTRAN or other mathematical or computer modeling. Once an optimal stiffness distribution is found, future interferometers can be designed to incorporate this optimal configuration.

In a typical application to a $CO_2$ laser, there are two transverse axes and one longitudinal axis to deal with. In selecting mounting points, it is usually possible to pick optimal points that satisfy two axes; it is best to try to balance out the most sensitive axes. Most laser devices have bilateral or left-right symmetry when viewing a cavity cross-section. This symmetry often results in the transverse axis being the least sensitive to vibration, thus making it more important to pick mounting points, mass distributions, or stiffness distributions that will minimize the vibrational effects in the two most sensitive axes, the vertical and axial.

The experimental setup shown in FIG. 6 allows one to directly measure the frequency deviations caused by the vibrations of a shake table. One can move mounts to reduce vibrational sensitivity, or if this is not possible, one can vary the weight distribution or stiffness distribution until the optimum distribution is obtained. The experimental setup shown in FIG. 6 makes it unnecessary to actually measure path length changes since a direct frequency deviation measurement is obtained through a heterodyne mixer 16.

In FIG. 6, laser transmitter 20 is mechanically coupled to vibrator 21 for deliberately introducing vibrationally caused instability $\Delta f(t)$ in the output optical frequency f. Beamsplitter 22 combines the transmitter output with a fixed frequency output signal $f-f_o$ from local oscillator laser 23. The combined beam is detected by the heterodyne mixer 16. The AC component of the mixer output is at the beat frequency between the two lasers, which is $f_{o+\Delta f(t)}$. The stabilization loop maintains a constant $f_o$ by applying corrective signals to piezoelectric translators (PZTs) that control the output frequency of each laser. The rapidly time dependent part of the beam frequency is $\Delta f(t)$ and is measured by the spectrum analyzer 26 or by the frequency discriminator 27 and differentiation circuit 28. The XYZ accelerometer 29 provides acceleration measurements for comparison with the measured frequency instability.

In practice, the location of the mounts will now increase the frequency stability by a factor of 10,000 for three reasons:

(1) The accuracy to which the mounting points can be located. The effects of the vibrational input will be reduced by a factor of $\sqrt{3}(\Delta l/L)$ from the effects with the mounts at the ends of the laser, where $\Delta l/L$ is the fractional error with which the mounting locations are found. These could probably be located to a precision of 2% of the full length, which would reduce the effects by a factor of 1/29. Experimental tuning by moving the mount locations or removing, adding, or moving weights on the laser might be able to improve this by a factor of $\frac{1}{2}$ or $\frac{1}{4}$.

(2) The mechanical resonant frequency of the laser structure must be well above the vibrational frequencies, otherwise the effects of the mechanical resonance will change the bending shape.

(3) The vibrational inputs at the two mounting locations must be correlated but do not have to be identical. Nonidentical vibrational inputs will require different mount locations than identical ones. If the vibrational inputs are partially correlated, this invention will compensate for the correlated portion.

Employment of the present invention results in a stiffly-mounted laser that is capable of being precisely pointed and is relatively insensitive to vibration insofar as resonant cavity frequency changes are concerned. The present invention does not solve thermally-related frequency instability problems but does not prevent the employment of systems that are designed to counteract thermal frequency instability.

It is to be understood that the above-described embodiment of the invention is illustrative only, and that modifications thereof may occur to those skilled in the art. Accordingly, this invention is not to be regarded as limited to the embodiment disclosed herein, but is to be limited only as defined by the appended claims.

What is claimed is:

1. In an interferometer structure including a resonant cavity structure and cavity reflectors whose relative positions determine the resonant cavity frequency of said resonant cavity, a mounting for said interferometer structure comprising:

at least one pair of support means connected to said structure, said strucure including a resonant cavity disposed between cavity end reflectors;

individual ones of said pair of support means each being connected to said structure at a distinct location relative to one of said cavity end reflectors, each individual one of said pair of support means being connected to said structure at a distinct location which is independant of the location of the other individual one of said pair of support means; and wherein each of said locations is selected from a plurality of possible support locations to reduce variations in said resonant cavity frequency when said structure is subjected to accelerating forces.

2. In an interferometer structure including a resonant cavity and cavity reflectors whose relative positions determine the resonant cavity frequency of said interferometer cavity, said interferometer having a mounting connected to said structure at at least two positions, said positions being selected from a plurality of possible mounting positions, a method for reducing the variations in said resonant cavity frequency caused by accelerating forces comprising the steps of:

supporting the structure with at least one pair of support means connected to the structure, the strucure including a resonant cavity disposed between cavity end reflectors;

the step of supporting being accomplished by connecting individual ones of the pair of support means such that each is connected to the structure at a distinct location relative to one of the cavity end reflectors, each individual one of the pair of support means being connected to the structure at a distinct location which is independent of the location of the other individual one of the pair of support means;

the step of connecting including a step of selecting, from a plurality of possible support locations, the location of each individual one of the pair of support means to reduce variations in the resonant cavity frequency when the structure is subjected to accelerating forces;

the method further including a step of;

trimming the mass distribution of the structure by selecting the distribution of mass within the structure so as to further reduce variations in resonant frequency caused by accelerating forces.

3. In an interferometer structure including a resonant cavity and cavity reflectors whose relative positions determine the resonant cavity frequency of said interferometer cavity, said interferometer having a mounting connected to said structure at at least two positions, said positions being selected from a plurality of possible mounting positions, a method for reducing the variations in said resonant cavity frequency caused by accelerating forces comprising the steps of:

supporting the structure with at least one pair of support means connected to the structure, the strucure including a resonant cavity disposed between cavity end reflectors;

the step of supporting being accomplished by connecting individual ones of the pair of support means such that each is connected to the structure at a distinct location relative to one of the cavity end reflectors, each individual one of the pair of support means being connected to the structure at a distinct location which is independant of the location of the other individual one of the pair of support means;

the step of connecting including a step of selecting, from a plurality of possible support locations, the location of each individual one of the pair of support means to reduce variations in the resonant cavity frequency when the structure is subjected to accelerating forces;

the method further including a step of:

selecting the distribution of stiffness within the structure so as to further reduce variations in resonant frequency caused by accelerating forces.

4. In an interferometer structure having a resonant cavity and a resonant cavity frequency associated therewith, said interferometer being mounted on at least two supports, each of said supports being positioned at a position selected from a plurality of possible support positions, a method for reducing vibrational sensitivity of the resonant cavity frequency comprising the steps of:

supporting the structure with at least one pair of support means connected to the structure, the structure including a resonant cavity disposed between cavity end reflectors;

the step of supporting being accomplished by connecting individual ones of the pair of support means such that each is connected to the structure at a distinct location relative to one of the cavity end reflectors, each individual one of the pair of support means being connected to the structure at a distinct location which is independant of the location of the other individual one of the pair of support means;

the method further comprising the steps of:

moving at least one individual one of the pair of support means;

monitoring vibrationally induced changes in resonant cavity frequency; and fixing the support means at a location that results in a reduced vibrational sensitivity of resonant cavity structure.

5. In an interferometer structure having a resonant cavity and a resonant cavity frequency associated therewith, said interferometer being mounted on at least two supports, each of said supports being positioned at a position selected from a plurality of possible support positions, a method for reducing vibrational sensitivity of the resonant cavity frequency comprising the steps of:

supporting the structure with at least one pair of support means connected to the structure, the structure including a resonant cavity disposed between cavity end reflectors;

the step of supporting being accomplished by connecting individual ones of the pair of support means such that each is connected to the structure at a distinct location relative to one of the cavity end reflectors, each individual one of the pair of support means being connected to the structure at a distinct location which is independant of the location of the other individual one of the pair of support means;

the step of connecting including a step of:

selecting, from a plurality of possible support locations, the location of each individual one of the pair of support means to reduce variations in the resonant cavity frequency when the structure is subjected to accelerating forces;

the method further comprising the steps of:

trimming the mass distribution of the structure by varying the mass distribution of the interferometer structure;

monitoring the change in resonant cavity frequency caused by vibrational excitation; and fixing the mass distribution at a specific distribution that results in a reduced vibrational sensitivity of resonant cavity frequency.

6. In an interferometer comprising a resonant cavity and resonant cavity reflectors and having a mounting structure comprised of at least one pair of supports, a weight distribution and a stiffness distribution being associated with the interferometer, a method for reducing a change in resonant cavity frequency caused by acceleration forces comprising the steps of:

supporting the structure with at least one pair of support means connected to the structure, the structure including a resonant cavity disposed between cavity end reflectors;

the step of supporting being accomplished by connecting individual ones of the pair of support means such that each is connected to the structure at a distinct location relative to one of the cavity end reflectors, each individual one of the pair of support means being connected to the structure at a distinct location which is independant of the location of the other individual one of the pair of support means;

the step of connecting including a step of:

selecting, from a plurality of possible support locations, the location of each individual one of the pair of support means to reduce variations in the resonant cavity frequency when the structure is subjected to accelerating forces;

the method further including the steps of:

selecting the distribution of stiffness within the structure so as to further reduce variations in resonant frequency caused by accelerating forces;

trimming the mass distribution of the structure by selecting the distribution of mass within the structure so as to still further reduce variations in resonant frequency caused by accelerating forces.

7. An interferometer structure including a resonant cavity and resonant cavity reflectors, said interferometer being mounted on at least two supports, each of said supports being positioned at a position selected from a plurality of possible support positions, said interferometer structure having a mass distribution and a resonant cavity frequency associated therewith, said interferometer structure further including:

at least one pair of support means connected to said structure, said strucure including a resonant cavity disposed between cavity end reflectors;

individual ones of said pair of support means each being connected to said structure at a distinct location relative to one of said cavity end reflectors, each individual one of said pair of support means being connected to said structure at a distinct location which is independant of the location of the other individual one of said pair of support means; wherein each of said locations is selected from a plurality of possible support locations to reduce variations in said resonant cavity frequency when said structure is subjected to accelerating forces;

said interferometer structure further comprising:

means attached to said structure for varying said mass distribution; and means for adjusting said varying means to change said mass distribution for reducing vibrationally induced changes in said resonant cavity frequency.

8. In a laser structure including a resonant cavity having cavity end reflectors whose relative positions one to another determine a frequency of the resonant cavity, a mounting for said laser structure comprising:

at least one pair of support means connected to said structure, said structure including a resonant cavity and cavity end reflectors;

individual ones of said pair of support means each being connected at a distinct location relative to an end of said cavity; and wherein said locations are asymmetric with respect to the ends of the cavity to minimize tilt between said reflectors due to accelerating forces.

9. In a laser structure including a resonant cavity having cavity end reflectors whose relative positions one to another determine a frequency of the resonant cavity, a mounting for said laser structure comprising:

at least one pair of support means connected to said structure, said structure including a resonant cavity and cavity end reflectors;

individual ones of said pair of support means each being connected at a distinct location relative to an end of said cavity;

said locations being assymetric with respect to the ends of said cavity to minimize tilt between said reflectors due to accelerating forces and; wherein there are two pairs of support means connected to said structure, individual ones of each of said pairs being connected opposite one another along a plane that passes through a neutral axis of said resonant cavity.

10. A method of determining an optimum position for individual ones of at least one pair of support members for a laser transmitter structure, the structure including a resonant cavity and a pair of cavity end reflectors, the optimum position being a position that minimizes a tilt between the end reflectors due to acceleration forces, comprising the steps of:

mechanically coupling the transmitter structure to a movable platform;

moving the platform such that the transmitter structure is accelerated for an interval of time (t) thereby inducing a frequency change $\Delta f(t)$ in an output of the transmitter structure;

comparing the frequency output of the transmitter structure with a reference frequency to determine a difference therebetween; and positioning each of the support members at a position which minimizes the difference between the reference frequency and the frequency output.

11. A method as defined in claim 10 wherein the step of comparing comprises the steps of:

providing a reference laser transmitter having a reference output frequency $f_o$;

combining the output frequency including $\Delta f(t)$, of the transmitter structure with the reference frequency $f_o$;

detecting the combined outputs with a heterodyne mixer to determine the magnitude of $\Delta f(t)$; and measuring the magnitude of $\Delta(f)t$.

12. A method as defined in claim 11 wherein the step of measuring is accomplished by a frequency discriminator.

13. A method as defined in claim 11 wherein the step of measuring is accomplished by a spectrum analyzer.

* * * * *